(12) United States Patent
Harding

(10) Patent No.: US 9,376,918 B2
(45) Date of Patent: Jun. 28, 2016

(54) AEROFOIL COOLING ARRANGEMENT

(71) Applicant: ROLLS-ROYCE PLC, London (GB)

(72) Inventor: Adrian Lewis Harding, Derby (GB)

(73) Assignee: ROLLS-ROYCE plc, London (GB)

( * ) Notice: Subject to any disclaimer, the term of this patent is extended or adjusted under 35 U.S.C. 154(b) by 891 days.

(21) Appl. No.: 13/682,109

(22) Filed: Nov. 20, 2012

(65) Prior Publication Data

US 2014/0064967 A1 Mar. 6, 2014

(30) Foreign Application Priority Data

Nov. 24, 2011 (GB) .................................. 1120269.4

(51) Int. Cl.
*F01D 5/18* (2006.01)

(52) U.S. Cl.
CPC *F01D 5/18* (2013.01); *F01D 5/186* (2013.01); *F05D 2240/81* (2013.01); *F05D 2260/201* (2013.01); *F05D 2260/204* (2013.01); *F05D 2260/2214* (2013.01); *F05D 2260/22141* (2013.01)

(58) Field of Classification Search
CPC ........... F01D 25/08; F01D 25/12; F01D 5/18; F01D 5/182; F01D 5/183; F01D 5/184; F01D 5/186; F01D 5/187; F01D 5/188; F01D 5/189; F01D 9/06; F01D 9/065; F05D 2240/81; F05D 2260/201; F05D 2260/203; F05D 2260/204; F05D 2260/221; F05D 2260/2214; F05D 2260/22141
USPC .......................................... 415/115; 416/97 R
See application file for complete search history.

(56) References Cited

U.S. PATENT DOCUMENTS

| 4,347,037 A * | 8/1982 | Corrigan ................. F01D 5/147 415/115 |
| 5,624,231 A * | 4/1997 | Ohtomo .................. F01D 5/186 415/115 |
| 7,600,973 B2 | 10/2009 | Tibbott et al. |
| 7,625,179 B2 * | 12/2009 | Cunha ..................... F01D 5/187 416/97 R |
| 7,625,180 B1 | 12/2009 | Liang |
| 2010/0104419 A1 | 4/2010 | Liang |

FOREIGN PATENT DOCUMENTS

| EP | 1 900 905 A2 | 3/2008 |
| GB | 2 246 174 A | 1/1992 |

OTHER PUBLICATIONS

European Search Report issued in Application No. 12 19 3453; Dated Jul. 18, 2013.
Feb. 24, 2012 British Search Report issued in Application No. GB1120269.4.

* cited by examiner

*Primary Examiner* — Dwayne J White
*Assistant Examiner* — Alexander White
(74) *Attorney, Agent, or Firm* — Oliff PLC

(57) ABSTRACT

An aerofoil typically for a blade or vane for a gas turbine engine comprises a pressure wall, a suction wall and a web that extends therebetween. One of the walls comprises an inner leaf and an outer leaf which defines a cavity, the other wall defines a first outlet, the aerofoil defines at least one first passage extending from the cavity through the web and to the outlet. Coolant in the cavity on one side wall of the aerofoil is thereby routed across the web to be used to cool the other wall by convention and formation of a coolant film.

15 Claims, 3 Drawing Sheets

AEROFOIL COOLING ARRANGEMENT

The present invention relates to a cooling arrangement of an aerofoil, such as in a blade or a vane, typically for a turbine stage of a gas turbine engine.

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling. In modern gas turbine engines, gas temperatures in a high-pressure turbine are hotter than the melting point of the material of the blades and vanes, necessitating internal air cooling of these aerofoil components.

Conventional high-pressure nozzle guide vane (NGV) castings have a mixture of internal impingement cooling, convection cooling and external film cooling. Impingement cooling systems utilise impingement plates adjacent an external wall and have an array of small holes through which coolant flows to strike the inner surface of the external wall. Impingement plates may be either separate plate inserted to the aerofoil or integrally cast.

U.S. Pat. No. 7,600,973B discloses a conventional 'multi-pass' cooling system where coolant passes both radially inwardly and outwardly through main cooling passages. This design uses film cooling, internal turbulators and impingement cooling to cool its suction side aerofoil wall. However, coolant films over the suction side wall's external surface are penalizing on performance but they are necessary to make up for relatively inefficient internal cooling.

There is an ever increasing desire to improve cooling of components in gas turbine engines and especially high-pressure turbine vanes and blades. Improved cooling has many benefits including allowing increased gas temperatures and increased overall engine efficiency, increased life of components and/or decreased amount of cooling air that could otherwise be used for increased propulsive efficiency.

It is therefore one of the objects of the present cooling arrangement to improve cooling effectiveness.

Thus a first aspect of the present invention provides an aerofoil for a gas turbine engine, the aerofoil comprises a pressure wall, a suction wall and a web, the web extends between the pressure wall and the suction wall, at least one of the pressure and suction walls comprise an inner leaf and an outer leaf that define a first cavity, the other of the pressure and suction walls defines a first outlet, the aerofoil defines at least one first passage extending from the cavity through the web and to the outlet.

The pressure wall, the suction wall and the web may define at least two main coolant passages.

The inner leaf is an impingement plate having an array of impingement holes through which coolant can pass from at least one of the two main coolant passages and impinge on the outer leaf.

The inner leaf and the outer leaf may define a second cavity and the pressure wall or suction wall defines a second outlet, the aerofoil defines at least one second passage extending from the second cavity through the web and to the second outlet.

The suction wall may comprise the inner leaf and the outer leaf.

The pressure wall may comprise the inner leaf and the outer leaf.

The aerofoil may have an array of first and/or second passages and an array of first and/or second outlets.

The arrays of first and second passages may comprise first and second passages alternately arranged within the web.

The passage(s) may be generally triangular in cross-section within at least a part of the web.

The pressure and suction walls may meet at a leading edge and at a trailing edge of the aerofoil, The first cavity may be located between the leading edge and the web and the second cavity is located between the web and the trailing edge.

A blade or vane may comprise the aerofoil of any one of the above paragraphs. A turbine or a compressor of a gas turbine engine may comprise the blade or vane.

Embodiments of the invention will now be described by way of example with reference to the accompanying drawings in which.

Figure 1:
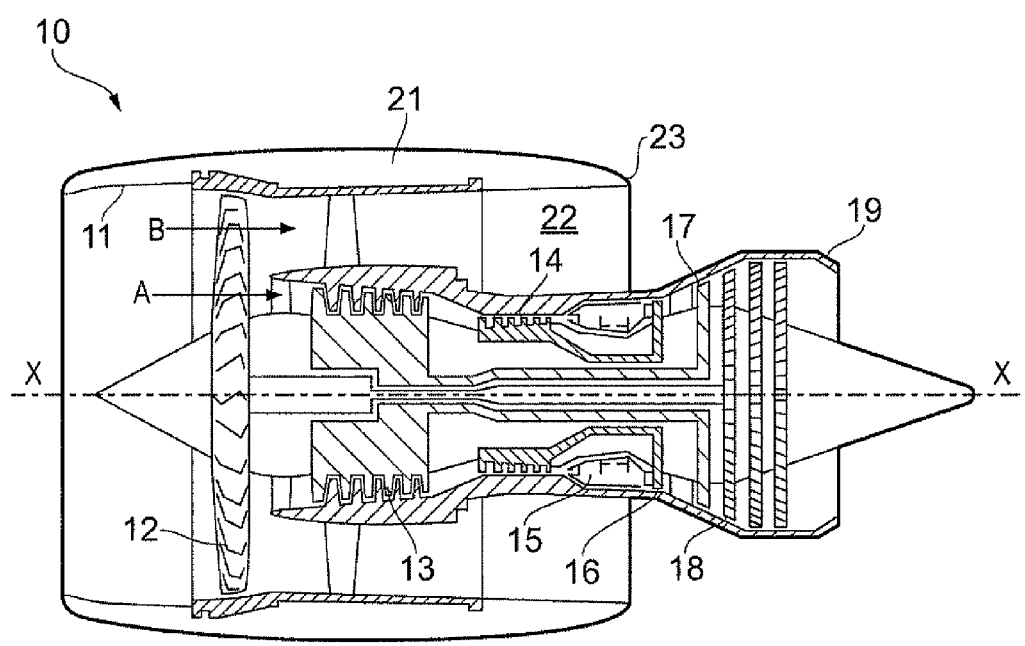
FIG. 1 shows a schematic longitudinal cross-section through a ducted fan gas turbine engine that may incorporate an aerofoil in accordance with the present disclosure.

With reference to FIG. 1, a ducted fan gas turbine engine generally indicated at 10 has a principal and rotational axis X-X. The terms radial, axial and circumferential are used with respect to this axis. The engine comprises, in axial flow series, an air intake 11, a propulsive fan 12, an intermediate pressure compressor 13, a high-pressure compressor 14, combustion equipment 15, a high-pressure turbine 16, an intermediate-pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
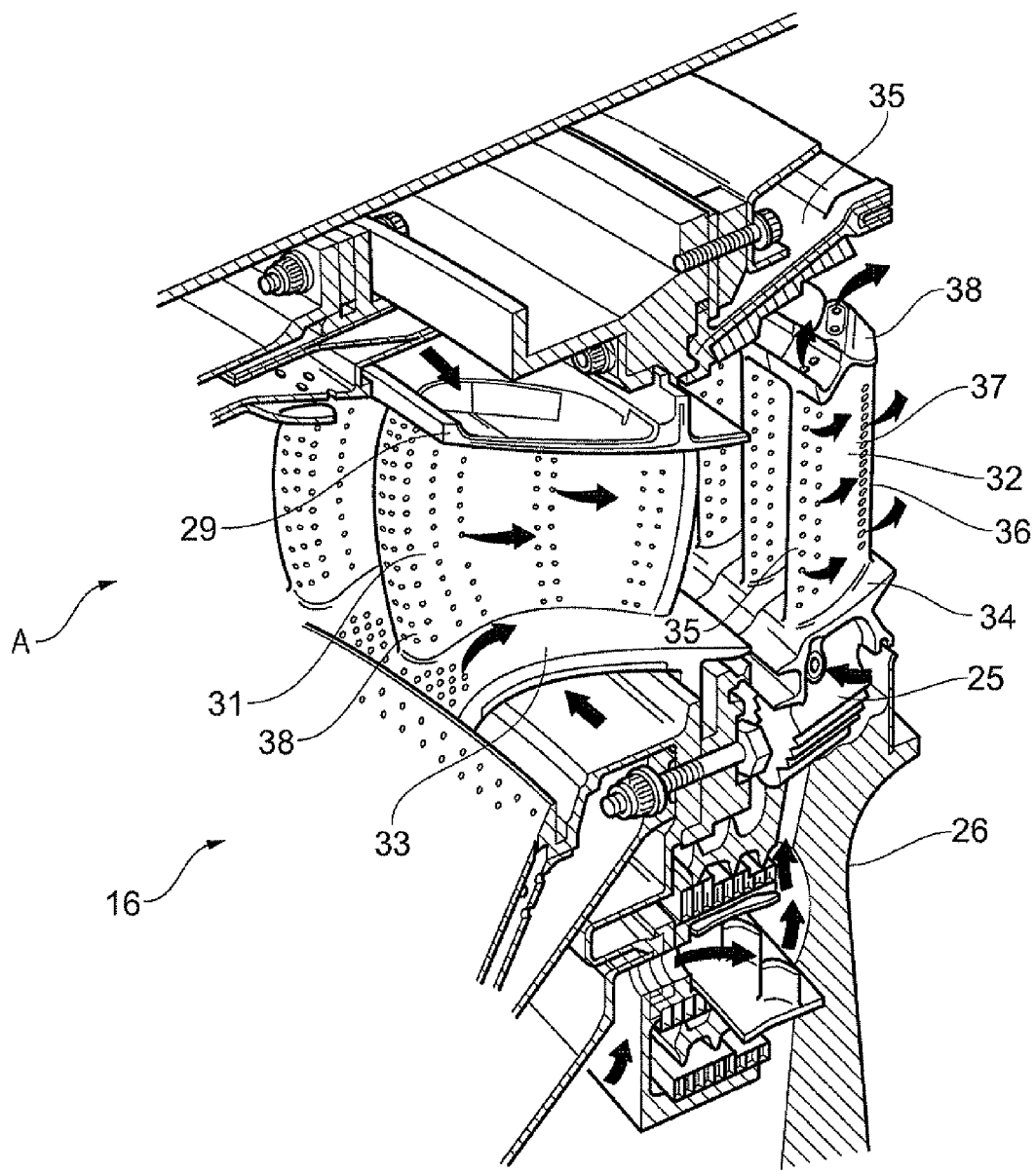
FIG. 2 shows an isometric view of a typical single stage cooled turbine that may incorporate an aerofoil in accordance with the present disclosure.

FIG. 2 shows an isometric view of a typical single stage cooled turbine. In this example the high-pressure turbine 16 is shown. The high-pressure turbine 16 comprises an annular array of radially extending stator vanes 31 and immediately downstream an annular array of radially extending blades 32 mounted to a rotor disc 26. The combustion gases impinge on the vanes which present the gases at an appropriate angle to efficiently drive the turbine blades.

The annular array of stator vanes 31 is immediately downstream of the combustor 15. The vanes therefore require significant cooling and typical cooling air flows are indicated by arrows. Internal convection and external cooling air films are the prime methods of cooling the gas path component— airfoils 37, platforms 33, shrouds 29 and shroud segments 35 etc. High-pressure turbine nozzle guide vanes 31 (NGVs) consume the greatest amount of cooling air on high temperature engines. High-pressure turbine blades 32 typically use about half of the NGV coolant flow. The intermediate-pressure and low-pressure stages downstream of the HP turbine use progressively less cooling air because the combustion gases become progressively cooler.

The high-pressure turbine airfoils are cooled by using high pressure air from one of the compressors, typically the high-pressure compressor, that has by-passed the combustor and is therefore relatively cool compared to the combustion or working gas temperature. Typical cooling air temperatures from the compressor are between 527° C. (800K) and 727° C. (1000K), while gas temperatures can be in excess of 1827° C. (2100K).

The cooling air from the compressor that is used to cool the hot turbine components is not used fully to extract work from the turbine. Therefore, as extracting coolant flow has an adverse effect on the engine operating efficiency and it is important to use the cooling air as effectively as possible.

The turbine blade 32 has a root 25, a platform 34, an aerofoil 37 and tip 38. The root 25 is in the form a 'fir-tree', as known in the art, and slots into a complimentary mounting on the rotor disc in known fashion. Other mounting configurations may be used. The platform 34 sits radially outwardly of the root 25 and partly defines a gas-wash surface between adjacent blades. The aerofoil 37 extends radially outwardly from the platform to the tip 38 and defines aerodynamic pressure and suction surfaces for the flow of combustion gases thereover. The tip 38 helps to prevent over-tip leakage and can comprise sealing features. The tip may be in the form of a full or partial shroud or be shroudless.

Figures 3, 4:
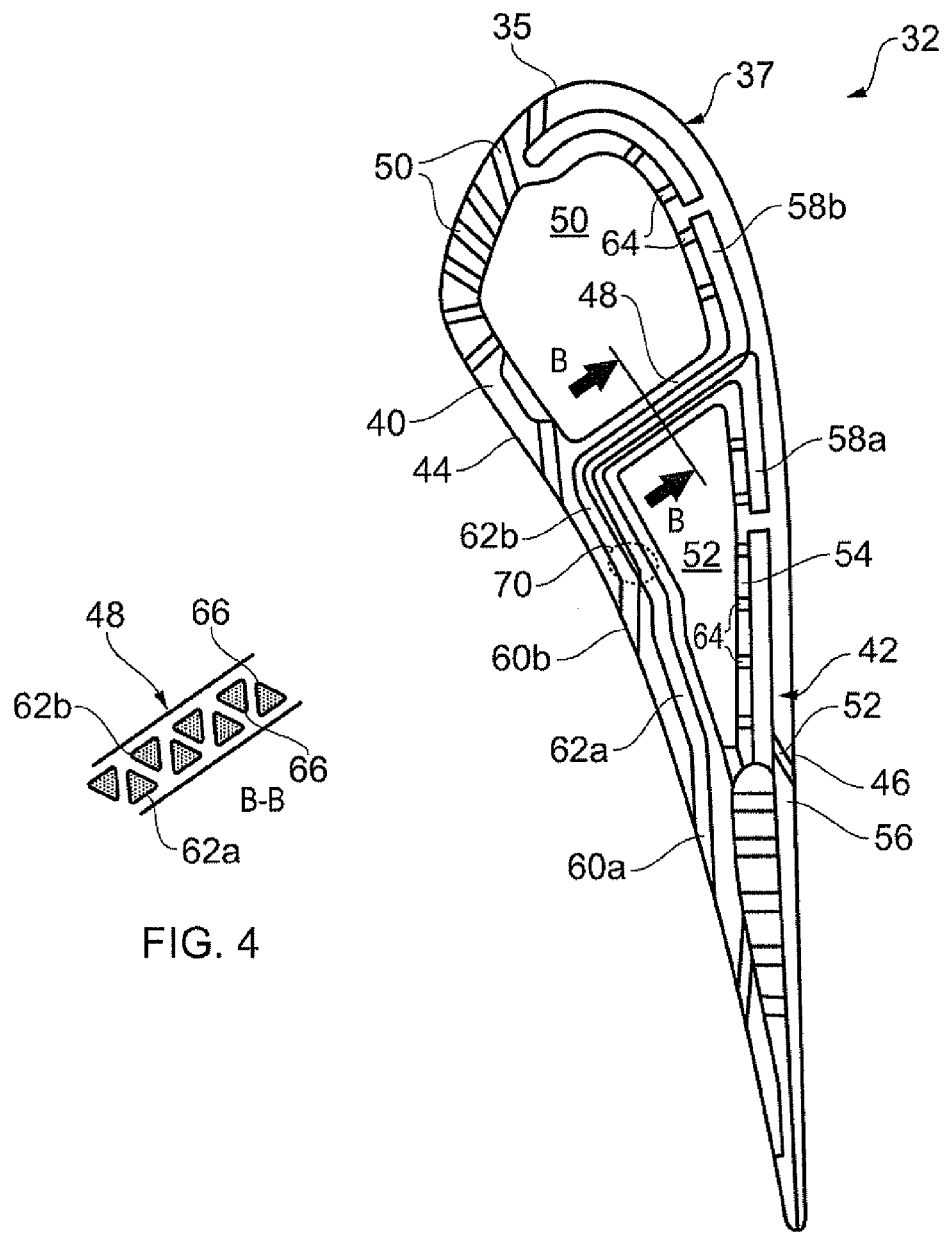
FIG. 3 shows a section through an aerofoil shown in FIG. 2 and is in accordance with the present disclosure.
FIG. 4 is a view on section B-B shown in FIG. 3.

Referring now to FIG. 3, which is a section through an aerofoil 37 of the turbine blade 32 shown in FIG. 2 and is in accordance with the present disclosure. The general arrangement of the aerofoil is equally applicable to the blade 32 or the vane 31.

The aerofoil 37 of the turbine blade 32 comprises a pressure wall 40 and a suction wall 42 which meet at a leading edge 35 and at a trailing edge 36. The pressure wall 40 and the suction wall 42 define pressure and suction surfaces 44, 46 respectively.

An internal web 48 extends between the pressure wall 40 and a suction wall 42 and which defines at least two main coolant passages 50, 52. In the example shown in FIG. 3 the two main coolant passages 50, 52 are referred to as the leading edge main passage 50 and the trailing edge main passage 52; the respective main passages being adjacent the leading and trailing edges 35, 36 respectively. The web 48 may extend generally radially from the root 25 to the tip 38 defining two independent main passages. Coolant enters the main passage (s) via the root and flows generally radially outwardly towards the tip. Alternatively, the web 48 may extend between the root 25 and tip 38 and define a gap adjacent either or both the root or tip to allow coolant to pass in a multi-pass type arrangement as known in the art. In these arrangements coolant enters one main passage via the root and flows generally radially outwardly towards the tip before turning and flowing radially inwardly towards the root along another main passage; for example coolant may enter the leading edge main passage flow radially outward and then flow radially inwardly along the trailing edge main passage. It should be appreciated that there are many known possible multi-pass and single pass cooling flow systems within blades and vanes and the present disclosure may be applicable to those. For example vanes may be fed coolant via the tip.

The aerofoil 37 has a suction side wall 42 having an inner leaf 54 and an outer leaf 56 that define a cavity 58a. Alternatively or as well as, the pressure wall may be constructed similarly. The inner leaf 54 is an impingement plate and comprises an array of impingement holes 64 through which coolant can pass from the main coolant passage 52 and impinge on the outer leaf 56. The number and arrangement, including position and size of the impingement holes 64 are such that jets of coolant are directed at an inner surface of the outer leaf 56. However, it is not necessary for the inner leaf 54 to be an impingement plate and a solid plate may be used with an inlet and an outlet adjacent the root 25 and tip 38 or vice versa. The inner plate 54 might also be highly perforated and effective to separate a dedicated coolant flow in the cavity 58 from the main flow through the main passage 50 or 52.

The pressure wall 40 defines an outlet 60a in its external gas-wash surface 44 and the aerofoil 37 defines a passage 62a extending from the cavity 58 through the web 48 and to the outlet 60a. Thus part of the coolant entering one or both the main passage 50 or 52 passes through the impingement holes 64 and into the cavity 58 where at least a portion of the coolant in the cavity the passes along the passage 62a through the outlet 60a to be discharged across the external surface 44 to provide a protective coolant film.

The inner leaf 54 and the outer leaf 56 can define a second cavity 58b and the pressure wall 40 (or suction wall 42) defines a second outlet 60b; the aerofoil defines a second passage 62b extending from the second cavity through the web 48 and to the second outlet 60b. It should be appreciated that further sets of cavities, passages and outlets may be implemented with or without additional webs. For example, the cavities 58a, 58b may extend the whole radial length between root 25 and tip 38 or only partially and there may be separate cavities positioned radially inwardly or outwardly of each other. These additional cavities may have dedicated passages and outlets. Furthermore, there may be more than one web 48 provided spanning between the pressure and suction walls. These arrangements may be useful where cooling requirements differ in areas of the aerofoil 37.

The embodiment used to describe the present aerofoil shows the suction wall 42 comprising the inner leaf and the outer leaf 56, which is the preferred embodiment. However, depending on operational conditions, aerofoil configurations and potential implementation in compressor blades and vanes it is possible that the pressure wall 40 may comprise the inner and outer leaves, while the suction surfaces defines the outlets.

Although FIG. 3 is only one section, it is intended that the aerofoil has a radially extending array of first and/or second passages 62a, 62b and an array of first and/or second outlets 60a, 60b. The arrays of first and second passages comprise first and second passages 62a, 62b alternately arranged within the web 48 as shown in FIG. 4. The passage(s) are shown generally triangular in cross-section and these shapes extend within at least a part of the web 48. Conveniently, alternate passages 62a and 62b are arranged with their apexes 66 pointing in opposing directions such that a compact array is formed along the radial extent of the web 48.

The cavities 58a and 58b are referred to as first and second cavities and the first cavity 58a is generally located between the trailing edge 36 and the web 48 and the second cavity 58b is generally located between the web 48 and the leading edge 58a. However, the 'first' and 'second' cavities may be interposed with one another.

This aerofoil 37 enables coolant that is used to impinge on the suction surface side of the aerofoil to then be routed and reused on the pressure wall external surface 44 as a film of coolant sometime referred to as effusion cooling.

The coolant flowing in a main passage is routed through a cavity 58a, 58b in the suction wall 42, through the web 48 which divides the leading edge main passage 50 from the trailing edge main passage 52 and into the pressure wall 40 before ejecting via film/effusion cooling holes or outlets 60a, 60b.

The passages and cavities are arranged so as to reduce the overall temperature of the aerofoil and reduce the temperature gradients within the aerofoil walls and web, so reducing stresses and improving component life.

By routing the coolant through the web 48 it releases heat to the web, further reducing thermal stresses in the aerofoil. This is particularly useful because web is between the two main passage coolant flows and can therefore increase overall heat removal from the aerofoil to the coolant.

In this particular embodiment, ejecting the coolant over the pressure wall surface 44 instead of the suction surface 46 is less penalising to the aerodynamic performance of the aerofoil and so improves overall efficiency of the engine. Effusion cooling holes 52 through the suction wall may still be used where additional cooling is require, for example near the trailing edge 36.

The passages 62a, 62b can either eject directly to the pressure surface 44 as shown or to a gallery 70 (shown dashed) which then feeds the film cooling holes 60a, 60b.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An aerofoil for a gas turbine engine, the aerofoil comprising:
    a pressure wall, a suction wall and a web, wherein
    the web extends between the pressure wall and the suction wall,
    the suction wall comprises an inner leaf and an outer leaf that define a first cavity and a second cavity therebetween,
    the pressure wall defines a first outlet and a second outlet,
    at least one first passage extends from the first cavity through the web and to the first outlet,
    at least one second passage extends from the second cavity to the second outlet through the web wherein the pressure wall and the suction wall meet at a leading edge and at a trailing edge of the aerofoil, and the first cavity is closer to the leading edge than the second cavity.

2. The aerofoil of claim 1, wherein the pressure wall, the suction wall and the web define at least two main coolant passages.

3. The aerofoil of claim 2, wherein the inner leaf of the suction wall is an impingement plate having an array of impingement holes through which coolant can pass from at least one of the two main coolant passages and impinge on the outer leaf.

4. The aerofoil of claim 3, wherein the first cavity has an array of impingement holes extending from the first main cooling passage, and the second cavity has an array of impingement holes extending from the second main cooling passage.

5. The aerofoil of claim 3, wherein the array of impingement holes includes a first array of impingement holes and a second array of impingement holes, the first cavity extending from the first array of impingement holes in a downstream direction towards the web, and the second cavity extending from the second array of impingement holes in an upstream direction towards the web.

6. The aerofoil of claim 1, wherein the pressure wall comprises a pressure wall inner leaf and a pressure wall outer leaf.

7. The aerofoil of claim 1, wherein the aerofoil has an array of first passages and/or second passages and an array of first outlets and/or second outlets.

8. The aerofoil of claim 7, wherein the array of first passages and/or second passages comprises first passages and/or second passages alternately arranged within the web.

9. The aerofoil of claim 8, wherein the first passages and the second passages alternate in the radial direction.

10. The aerofoil of claim 1, wherein the at least one first passage and/or the at least one second passage is generally triangular in cross-section within at least a part of the web.

11. The aerofoil of claim 1, wherein the pressure wall and the suction wall meet at a leading edge and at a trailing edge of the aerofoil, and
    the first cavity is located between the leading edge and the web and the second cavity is located between the web and the trailing edge.

12. A blade or vane comprising the aerofoil of claim 1.

13. A turbine or a compressor of a gas turbine engine comprising the blade or vane of claim 12.

14. The aerofoil of claim 1, wherein the second outlet is closer to the leading edge than the first outlet.

15. The aerofoil of claim 1, wherein the web forms a junction with the pressure wall, and the first outlet and the second outlet are downstream of the pressure wall junction.

* * * * *